(12) United States Patent
Shirakawa

(10) Patent No.: US 6,663,292 B1
(45) Date of Patent: Dec. 16, 2003

(54) OPTICAL CONNECTOR AND AN ASSEMBLY METHOD OF OPTICAL PLUG

(75) Inventor: Tsuguhito Shirakawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 325 days.

(21) Appl. No.: 09/630,739

(22) Filed: Aug. 2, 2000

(30) Foreign Application Priority Data

Aug. 5, 1999 (JP) .......................................... 11-222160

(51) Int. Cl.[7] .................................................. G02B 6/36
(52) U.S. Cl. ........................................................ 385/78
(58) Field of Search ............................. 385/59, 60, 76, 385/77, 78, 62, 81, 139

(56) References Cited

U.S. PATENT DOCUMENTS 4,645,295 A    2/1987    Pronovost .................. 350/96.2
6,485,194 B1 *  11/2002    Shirakawa ................... 385/78

FOREIGN PATENT DOCUMENTS

| EP | 0 533 496 A | 3/1993 |
|---|---|---|
| GB | 2 032 130 A | 4/1980 |
| JP | 10-78534 | 3/1998 |

OTHER PUBLICATIONS

Patent Abstracts of Japan, vol. 1998, no 08, Jun. 30, 1998 & JP 10 078534A (Yazaki Corp), Mar. 24, 1998.

* cited by examiner

*Primary Examiner*—Javaid H. Nasri
(74) *Attorney, Agent, or Firm*—Armstrong, Kratz, Quintos, Hanson & Brooks, LLP

(57) ABSTRACT

An optical connector as an optical plug is provided, which includes: an optical fiber cable; a ferrule connected to an end of the optical fiber cable and constructing a ferrule assembly along with the optical fiber cable; a spring arranged over the optical fiber cable, an end of the spring pressing the ferrule; a plug housing to accommodate the ferrule assembly and the spring; and a spring cap to be connected to the plug housing for supporting another end of the spring, wherein the spring cap has a lower spring cap and an upper spring cap to couple with the lower spring cap, at least one of the spring caps engaging the plug housing, and the one of the spring caps has both of a straight path to straightly lead out the optical fiber cable in an axial direction of the ferrule and a curved path to curvingly lead out the optical fiber cable. Also, an assembly method of the optical plug is provided.

4 Claims, 7 Drawing Sheets

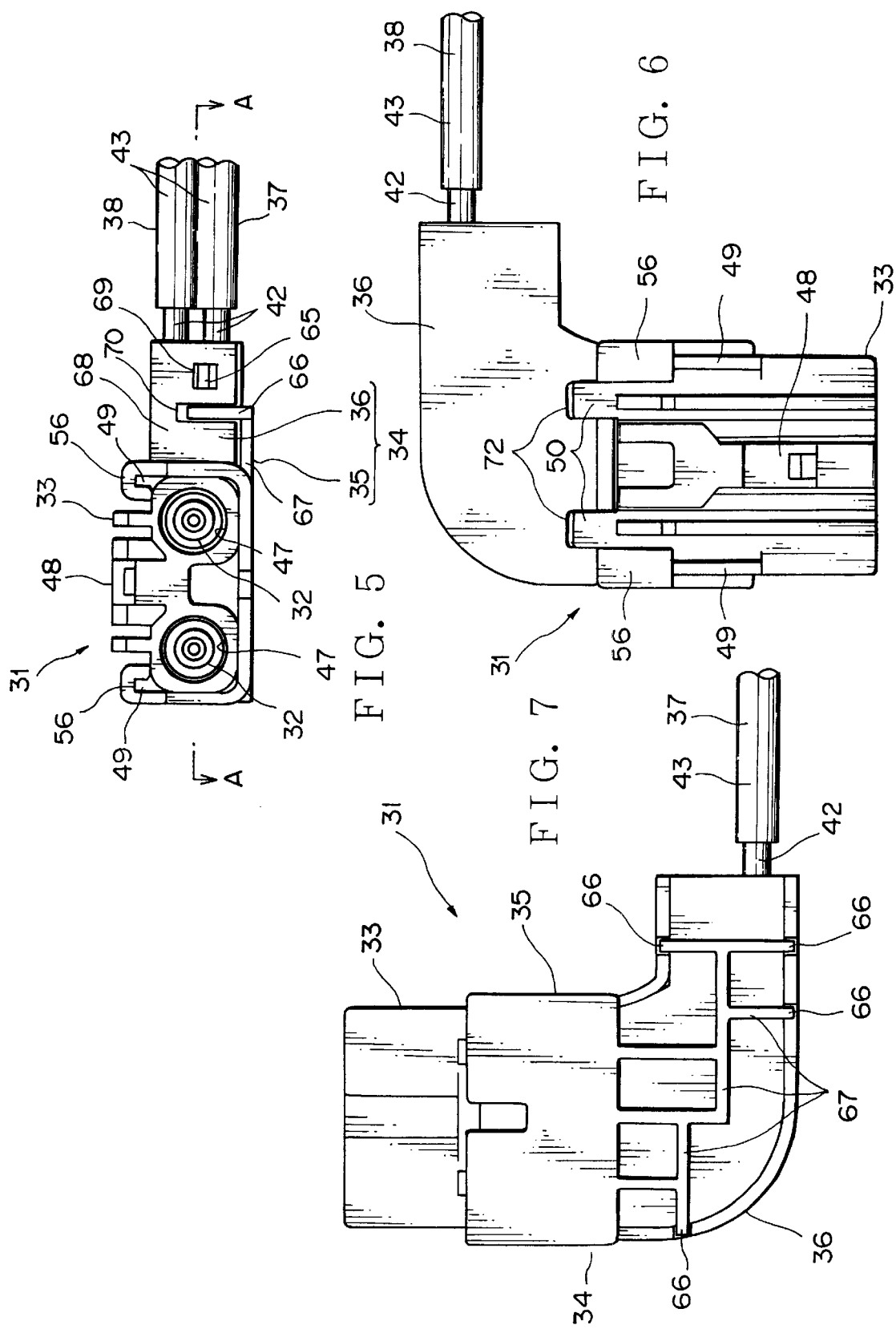

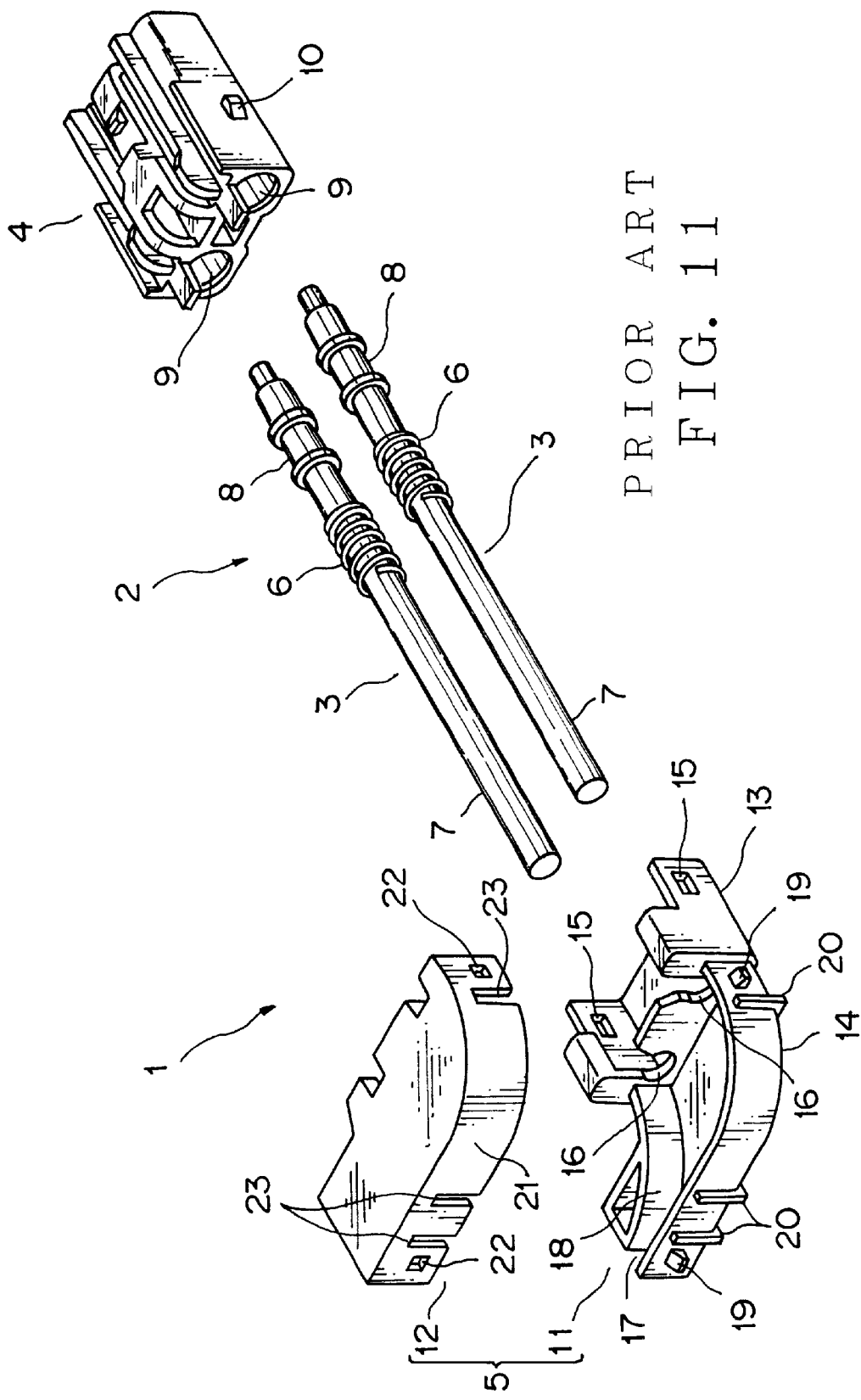

OPTICAL CONNECTOR AND AN ASSEMBLY METHOD OF OPTICAL PLUG

BACKGROUND OF THE INVENTION

1. Field of the Invention

The present invention relates generally to an optical connector, and more particularly to an optical connector as an optical plug used for a multiplex transmission circuit, for example, of a vehicle such as motor vehicle and to an assembly method of the optical plug.

2. Description of the Related Art

An optical connector is used to connect an optical fiber cable with a transmitter, a receiver, or another optical fiber cable constituting the above multiplex transmission circuit.

Because the optical fiber cable is weak in extreme bending and distortion, the optical fiber cable is usually led out of the optical connector straight. In a circumstance, like in a vehicle, that various electric equipment and wiring harnesses are thickly arranged, however, the optical fiber cable is often led out of the optical connector, while being curved in a minimum bending radius.

Though an optical connector disclosed in Japanese Patent Application Laid-open No. 10-78534 is known as an optical connector with a curved optical fiber cable, an optical connector 1 shown in FIG. 11 is used.

Hereinafter, the above optical connector 1 will be described, referring to FIG. 11. The optical connector 1 consists of a receptacle (not illustrated) and an optical plug 2 to be coupled with the receptacle. The optical plug 2 has ferrule assemblies 3, a plug housing 4, and a spring cap 5.

The ferrule assembly 3 is formed by connecting a ferrule 8 on the end of an optical fiber cable 7 on which a compression spring 6 is arranged. One end of the compression spring 6 abuts against the ferrule 8.

The plug housing 4 couples with a coupling portion (not illustrated) of the receptacle and has longitudinal accommodating chambers 9 to accommodate the respective ferrule assemblies 3. And, a claw-like engaging projection 10 is protrusively-provided on each sidewall of the plug housing 4. (one engaging projection 10 is illustrated.)

The spring cap 5 consists of a lower spring cap 11 and an upper spring cap 12, which lower spring cap 11 engages the rear of the plug housing 4.

The lower spring cap 11 has an engaging portion 13 to engage the plug housing 4 and a leading-out direction restricting portion 14 to restrict the direction of the optical fiber cables. The engaging portion 13 is provided with four-sided holes 15 to engage the engaging projections 10 and fiber leading-out portions 16 against which the other ends of the respective compression springs 6 abut and through which the optical fiber cables 7 pass.

The leading-out direction restricting portion 14 curves the optical fiber cables 7 by about 90° for leading them in a lateral direction. The curved optical fiber cables 7 are led outside out of an opening portion 17 provided on the leading-out direction restricting portion 14. A sidewall of the leading-out direction restricting portion 14, at a side of a smaller radius of curvature, is provided with a supporting surface 18 curving in a circular-arc. And, another sidewall of the leading-out direction restricting portion 14, at a side of a large radius of curvature, is provided with engaging projections 19 and ribs 20 to engage the upper spring cap 12 and is formed to make the optical fiber cables 7 curve.

The upper spring cap 12 is formed to cover the leading-out direction restricting portion 14 of the lower spring cap 11. And, a sidewall 21 of the upper spring cap 12 is provided with four-sided holes 22 to engage the above engaging projections 19 and guide grooves 23 to receive the above ribs 20.

With respect to the above-described optical connector 1, however, work efficiency for assembly following the ferrule assemblies 3 having been accommodated in the accommodating chambers 9 of the plug housing 4 is not good.

That is, it is not easy to engage the lower spring cap 11, in a state of accommodating the curved optical fiber cables 7 in its leading-out direction restricting portion 14, with the rear of the plug housing 4, which causes poor work efficiency.

More specifically, after having accommodated the optical fiber cables 7 in the leading-out direction restricting portion 14, the optical fiber cables 7 are held, the lower spring cap 11 is engaged with the plug housing 4, and the upper spring cap 12 is coupled with the lower spring cap 11.

Also, when the lower spring cap 11 is engaged with the plug housing 4, because the lower spring cap 11 has to be pushed against the compression spring 6 so that the holes 15 engage the engaging projections 10, the curved optical fiber cables 7 are apt to be moved due to the above movement of the lower spring cap 11 in the leading-out direction restricting portion 14, which would require repeated curving work for the cables 7.

The above poor work efficiency causes to increase the assembling cost.

SUMMARY OF THE INVENTION

In view of the foregoing, an object of the present invention is to provide an optical connector and an assembly method of an optical connector as an optical plug, wherein the assembly work efficiency is improved and the assembly cost is reduced.

In order to achieve the above-described object, as a first aspect of the present invention, an optical connector as an optical plug comprises: an optical fiber cable; a ferrule connected to an end of the optical fiber cable and constructing a ferrule assembly along with the optical fiber cable; a spring arranged over the optical fiber cable, an end of the spring pressing the ferrule; a plug housing to accommodate the ferrule assembly and the spring; and a spring cap to be connected to the plug housing for supporting another end of the spring, wherein the spring cap has a lower spring cap and an upper spring cap to couple with the lower spring cap, at least one of the spring caps engaging the plug housing, and the one of the spring caps has both of a straight path to straightly lead out the optical fiber cable in an axial direction of the ferrule and a curved path to curvingly lead out the optical fiber cable.

As a second aspect of the present invention, in the structure with the above first aspect, a closing portion to close a leading-out portion for the optical fiber cable arranged in the straight path is formed on the other of the spring caps.

As a third aspect of the present invention, in the structure with either one of the above first and second aspects, the curved path has a fiber cable fixing portion to check restoration of the optical fiber cable being in a curved state and to define the curved path from the straight path.

As a fourth aspect of the present invention, an assembly method of an optical plug, comprising a ferrule assembly, a plug housing, and a spring cap having a lower spring cap and an upper spring cap to couple with the lower spring cap, at least one of the spring caps engaging the plug housing and having a straight path and a curved path both for the optical fiber cable, comprises the steps of: a fiber terminal end treatment step for forming the ferrule assembly by putting a compression spring over the optical fiber cable and by connecting the ferrule to an end of the optical fiber cable; a ferrule assembly accommodation step for accommodating the ferrule assembly in the plug housing; a first spring cap assembly step for accommodating the optical fiber cable led out of the plug housing in the straight path straightly in an axial direction of the ferrule and engaging the one of the spring caps with the plug housing; a second spring cap assembly step for shifting the optical fiber cable from the straight path to the curved path; and a third spring cap assembly step for coupling the one of the spring caps with the other of the spring caps.

According to the above-described structure of the present invention, the following advantages are provided.

(1) Because the straight path and the curved path for the optical fiber cables are provided at least in either one, which engages the plug housing, of the upper spring cap and the lower spring cap, the spring cap having the paths can be engaged with the plug housing in a state that the optical fiber cables led out of the plug housing remain straight in the straight path. After the spring cap having the paths has been engaged with the plug housing, the straight optical fiber cables in the straight path are shifted into the curved path and then the other spring cap is coupled to the previous spring cap, whereby the assembly of the optical plug can be completed easily. Accordingly, though the present optical plug (i.e. the optical connector) has the same number of components as the prior art one, the assembly work efficiency can be improved by means of the above-described path change, thereby reducing the assembling cost.

(2) The assembly work efficiency can be improved and the assembling cost can be reduced, while remaining the appearance and the function unchanged.

(3) The paths can be clearly defined each other during assembly and the curved optical fiber cables are supported or fixed by the fiber cable fixing portion thereby to easily couple the spring caps, thereby further improving the assembly work efficiency.

(4) Though the present optical plug (i.e. the optical connector) has the same number of components as the prior art one, the assembly work efficiency can be improved by means of the above-described path change, thereby reducing the assembling cost.

The above and other objects and features of the present invention will become more apparent from the following description taken in conjunction with the accompanying drawings.

BRIEF DESCRIPTION OF THE DRAWINGS

FIG. 5 is a front view of the optical plug;

FIG. 6 is a plan view of the optical plug;

FIG. 7 is a bottom view of the optical plug;

FIG. 11 is an exploded perspective view of a prior art optical plug.

DESCRIPTION OF THE PREFERRED EMBODIMENT

An embodiment of the present invention will now be described in further detail with reference to the accompanying drawings.

Figure 1:
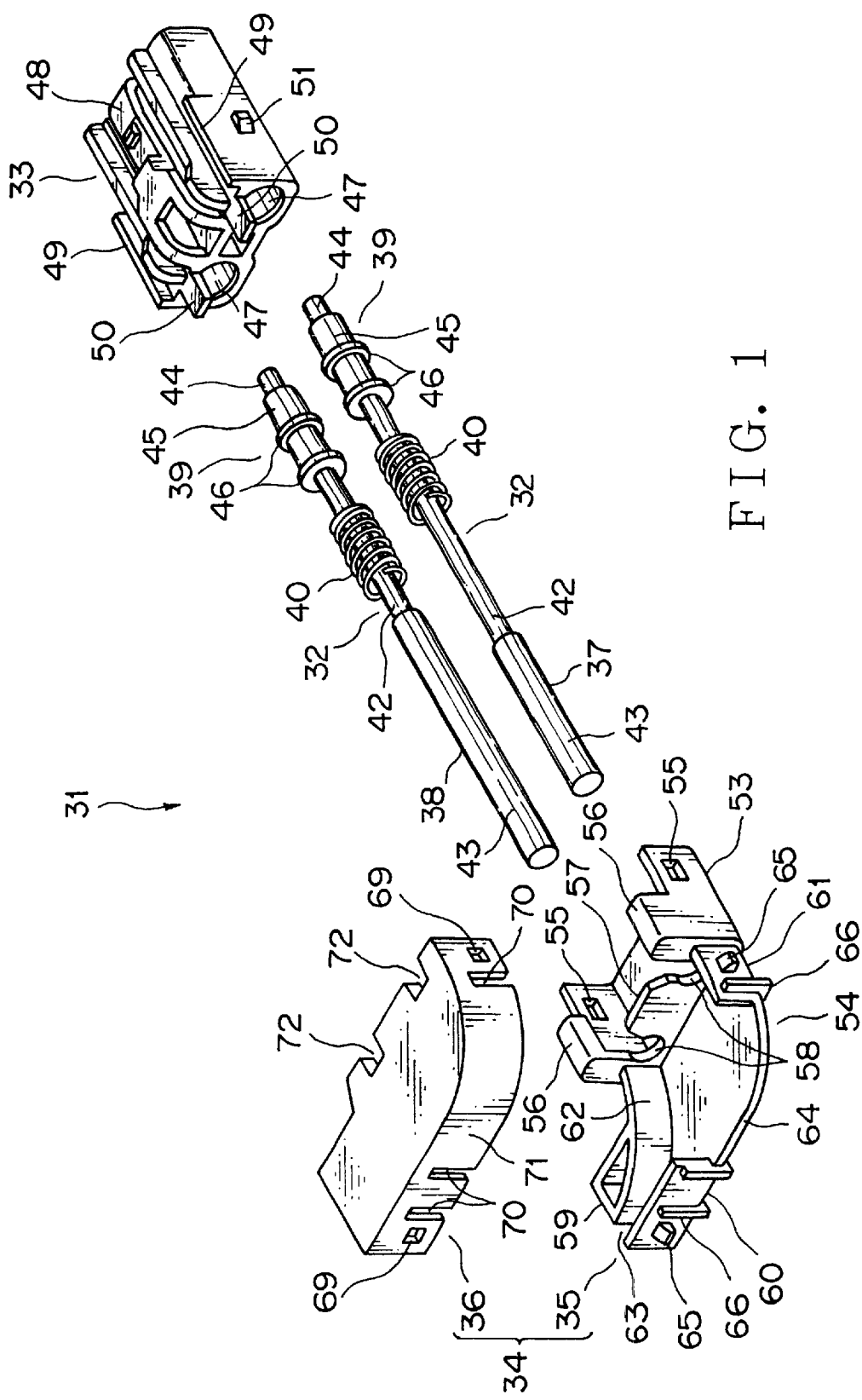
FIG. 1 is an exploded perspective view showing an embodiment of the optical plug of an optical connector in accordance with the present invention.
Figure 2:
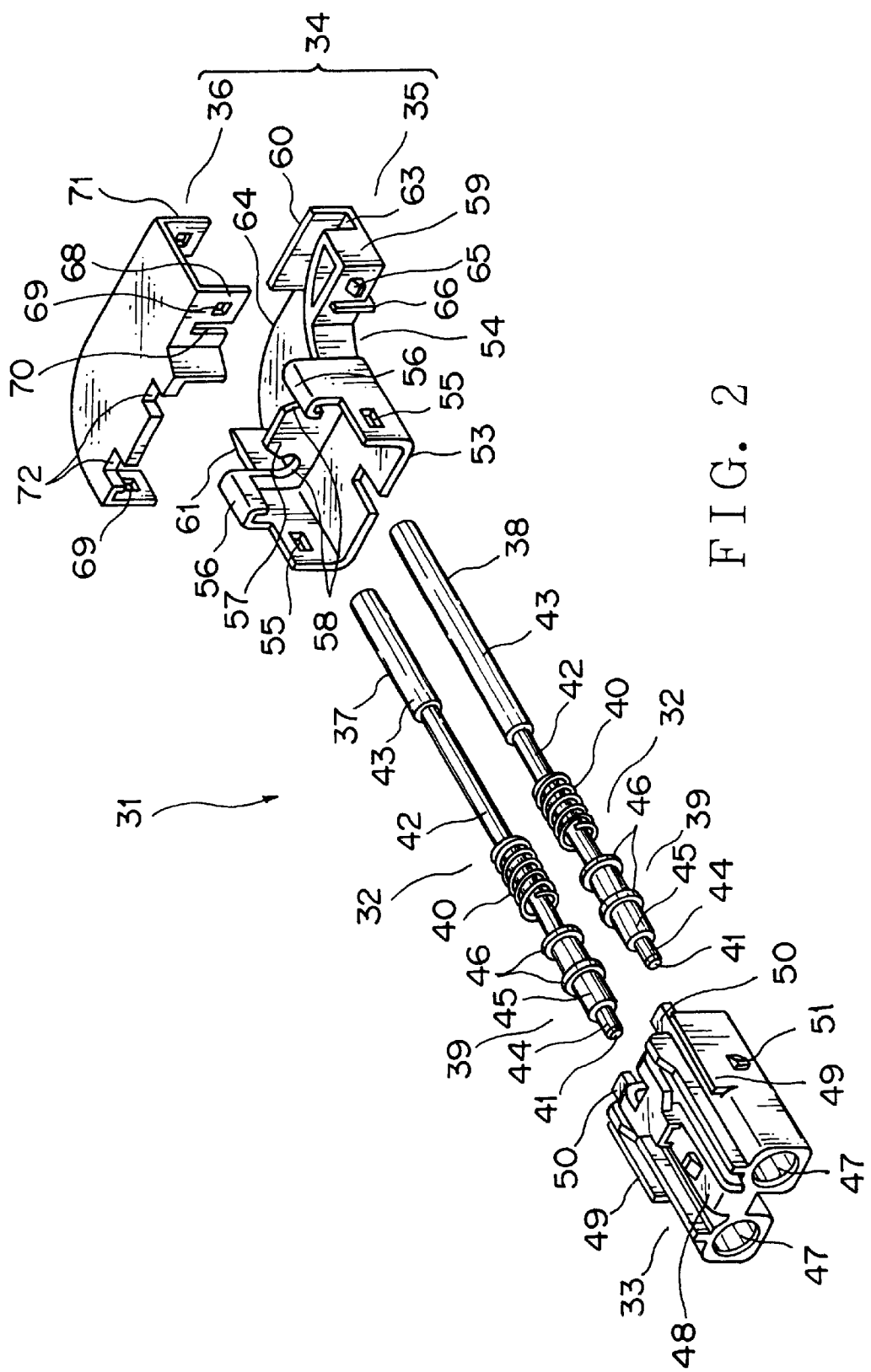
FIG. 2 is an exploded perspective view of the optical plug, taken reversely to FIG. 1.
Figure 3:
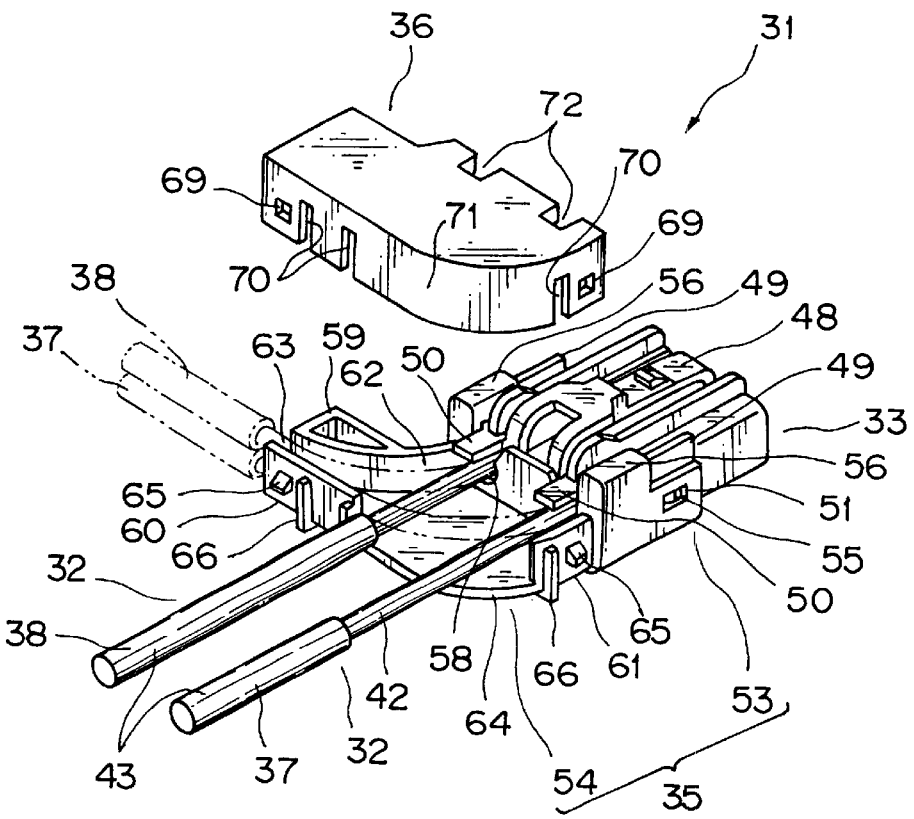
FIG. 3 is an exploded perspective view showing the optical plug for explaining a first spring cap assembly step and a second spring cap assembly step.
Figure 4:
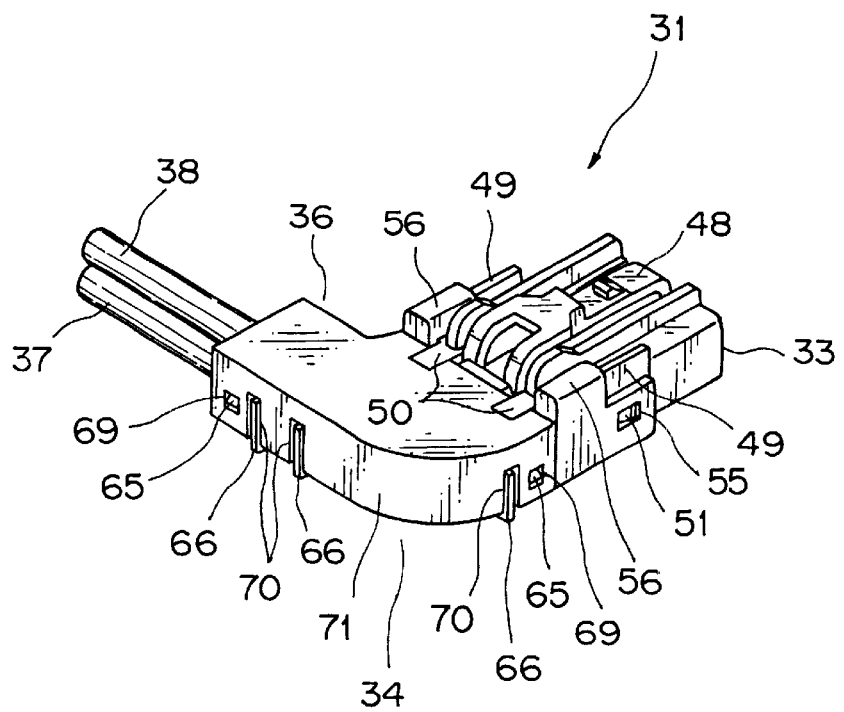
FIG. 4 is a perspective view showing the optical plug for explaining a third spring cap assembly step to follow the state of FIG. 3.
Figure 8:
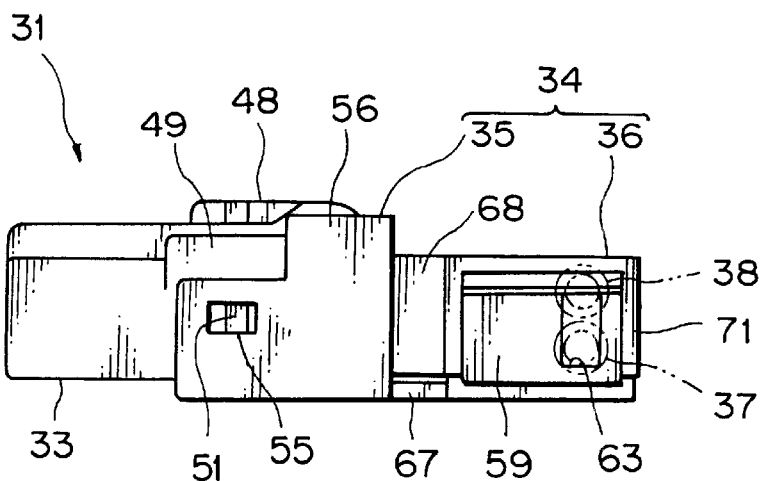
FIG. 8 is a side view of the optical plug.
Figure 9:
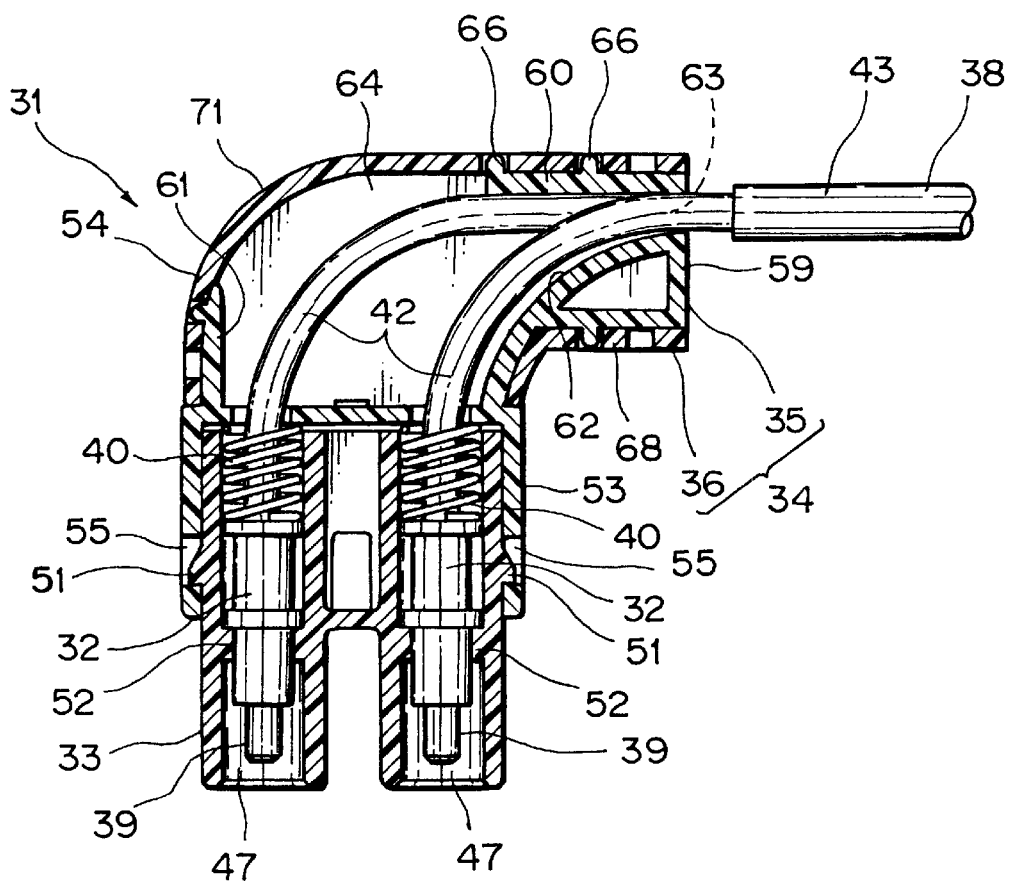
FIG. 9 is a sectional view taken along a line A–A in FIG. 5.

FIG. 1 is an exploded perspective view showing an embodiment of the optical plug of an optical connector in accordance with the present invention; FIG. 2 is an exploded perspective view of the optical plug, taken reversely to FIG. 1; FIG. 3 is an exploded perspective view showing the optical plug for explaining a first spring cap assembly step and a second spring cap assembly step; FIG. 4 is a perspective view showing the optical plug for explaining a third spring cap assembly step to follow the state of FIG. 3; FIG. 5 is a front view of the optical plug; FIG. 6 is a plan view of the optical plug; FIG. 7 is a bottom view of the optical plug; FIG. 8 is a side view of the optical plug; and FIG. 9 is a sectional view taken along a line A—A in FIG. 5.

In FIGS. 1 and 2, reference character 31 shows an optical plug which constitutes an optical connector along with an un-illustrated receptacle. The optical plug 31 consists of ferrule assemblies 32, a plug housing 33, and a spring cap 34.

The spring cap 34 consists of an upper spring cap 36 and a lower spring cap 35 to be coupled with the upper spring cap 36. As shown in FIG. 3, the lower spring cap 35 can engage the rear of the plug housing 33 in a state of the optical fiber cables 37,38 being straightly led out of the rear end of the plug housing 33 accommodating the ferrule assemblies 32. And, the optical fiber cables 37,38 are set in a curved state as shown, and then the upper spring cap 36 is coupled to the lower spring cap 35 (FIG. 4).

First, the structural members are specifically described hereinafter.

As shown in FIGS. 1 and 2, the above ferrule assemblies 32 are made up of the optical fiber cables 37,38, the ferrules 39, and compression springs 40. The ferrule assemblies 32 are connected to the respective ends of the optical fiber cables 37,38, and the compression springs 40 are set around the optical fiber cables 37,38.

The optical fiber cables 37,38 consist of core fiber portions 41 (FIG. 2) each consisting of a core and an outer layer (hereinafter, a cladding), primary sheathings 42 covering the respective core fiber portions 41, and secondary sheathings 43 covering the respective primary sheathings 42. The above core fiber portion 41 having no sheathing is fit in a later-described small-diameter portion 44 of the ferrule 39. And, the core fiber portion 41 with only the primary sheathing 42 is fit in a later-described large-diameter portion 45 of the ferrule 39.

The primary sheathing 42 exposes within the limits between the rear end of the ferrule 39 and an exit of the lower spring cap 35 in a curved state of the optical fiber cable. Because the optical fiber cables 37,38 within the limits are thinner than the other portions thereof, the work efficiency for curving the optical fiber cables is improved, and even if the optical fiber cables 37,38 are curved with the same radius as of the conventional ones, the optical fiber cables 37,38 in a curved state do not suppress the springs 40.

The length of the curved extents of the respective optical fiber cables 37,38 are different. That is, the exposed lengths of the respective primary sheathings 42 are different as shown in FIG. 1.

The ferrule 39 is formed in a cylindrical shape with a small-diameter portion, a large-diameter portion 45, and a step therebetween. A pair of flanges 46 are provided on the large-diameter portion 45. At the front end surface of the ferrule 39, i.e. at the front end surface of the small-diameter portion 44, the core fiber portion 41 of each of the optical fiber cables 37,38 is exposed.

One end of the compression spring 40 abuts against the flange 46.

The compression spring 40 may be of the compression spring 6 of FIG. 11 and has a larger inside diameter than an outside diameter of the secondary sheathing 43. Because the compression springs 40 are arranged over the respective exposing portions of the primary sheathings 42, there exists a large diameter-difference therebetween, which prevents the compression spring 40 from receiving pressure from the cable, thereby improving action of the compression spring 40.

The plug housing 33 is formed in a box-shape as shown in FIGS. 1–9, and accommodating chambers 47 are longitudinally formed therein. And, a locking arm 48, a pair of guide ribs 49 and a pair of fiber holding ribs 50 are provided on an upper wall of the plug housing 33. Also, a pair of claw-like engaging projections 51 are formed on the respective sidewalls.

The ferrule assemblies 32 are accommodated in the respective accommodating chambers 47 which have respective stoppers 52 for the respective ferrule assemblies 32 in their intermediate portions.

The locking arm 48 is provided at the middle portion of the upper wall of the plug housing 33 so as to couple with the receptacle (not illustrated).

The guide ribs 49 are formed continuing from the respective sidewalls thereof so as to prevent the lower spring cap 35 from slipping off.

The cantilevered fiber holding ribs 50 are arranged near respective rear openings of the accommodating chambers 47 so as to hold the respective optical fiber cables 37,38 (i.e. the primary sheathings 42 thereof) connected to the accommodated ferrule assemblies 32, thereby, for example, facilitating an assembly of the upper spring cap 36. And, when the optical fiber cables 37,38 are pulled upward before mounting the upper spring cap 36, a stress in each of the optical fiber cables 37,38 is weakened due to elasticity of the respective ribs 50.

The above lower spring cap 35 is formed in a L-shape as shown in FIGS. 1–9 and has an engaging portion 53 for the plug housing 33 and a leading-out direction restricting portion 54 for the optical fiber cables 37,38.

The engaging portion 53 continues to the leading-out direction restricting portion 54, and the hole 55 and the guide rib engaging portion 56 are formed on each of the sidewalls of the engaging portion 53. And, a partition 57 having fiber leading-out portions 58 is provided between the engaging portion 53 and the leading-out direction restricting portion 54.

The hole 55 is formed in a four-sided figure so as to engage the engaging projection 51. And, the guide rib engaging portion 56 has a groove for sliding the above guide rib 49 therein.

The fiber leading-out portions 58 each are formed in a U-shape from an upper edge of the partition 57 on which the ends of the compression springs 40 abut. That is, the ferrule assemblies 32 are pushed toward the front side of the plug housing 33 in a state of the lower spring cap 35 being engaging the rear of the plug housing 33.

The leading-out direction restricting portion 54 curves the optical fiber cables 37,38, being led out of the rear end of the plug housing 33, by about 90° and has three sidewalls 59,60,61.

The sidewall 59, at a side of a smaller radius of curvature, is provided with a supporting surface 62 curving in a circular-arc. And, the sidewall 60 (i.e. a fiber cable fixing portion) is arranged substantially facing the supporting surface 62. The sidewall 60 checks restoration of the curved optical fiber cables 37,38 and forms one side of a later-described straight path.

Between the sidewalls 59,60 formed is an opening portion 63 which leads the curved optical fiber cables 37,38 outside. And, between the sidewalls 60,61 formed is another opening portion 64 (i.e. a leading-out portion) which leads the straight optical fiber cables 37,38 outside.

A curved path with the opening portion 63 to lead the optical fiber cables 37,38 from the fiber leading-out portions 58 along the supporting surface 62 is formed on the leading-out direction restricting portion 54. And, as described above, the straight path with the opening portion 64 for the optical fiber cables 37,38 is formed on the leading-out direction restricting portion 54.

The three sidewalls 59,60,61 each are provided with an engaging projection 65 and a rib 66 for use in coupling with the upper spring cap 36, and each rib 66 continues to a reinforcing rib 67 (FIG. 5) formed on the backside of the leading-out direction restricting portion 54.

The above upper spring cap 36 to cover the leading-out direction restricting portion 54 is provided with a hole 69 to engage the above engaging projection 65 on the sidewall 68 which overlaps with the above sidewall 59 and a guide groove 70 to receive the above rib 66. And, a sidewall 71 (i.e. a closing portion), which overlaps with the sidewalls 60,61 and closes the above opening portion 64, of the upper spring cap 36 is provided with the similar holes 69 and the guide grooves 70.

Reference character 72 designates recesses for receiving the fiber holding ribs 50 of the plug housing 33 when coupled with the lower spring cap 35.

Next, a detailed assembly process (i.e. a method) of the above optical plug 31 is described.

A process has a fiber terminal end treatment step, a ferrule assembly accommodation step and first to third spring cap assembly steps.

First, the ferrule assemblies 32 are formed in the fiber terminal end treatment step (cf. FIG. 1 and FIG. 2). That is, the compression springs 40 are put over the optical fiber cables 37,38, and the ferrules 39 are connected to the ends of the optical fiber cables 37,38 so as to form the ferrule assemblies 32.

And, the above ferrule assemblies 32 are accommodated in the accommodating chambers 47 of the plug housing 33 in the ferrule assembly accommodation step (cf. FIG. 1 or FIG. 3).

Following the above, the first spring cap assembly step is carried out, wherein the lower spring cap 35 is to be engaged to the rear of the plug housing 33 (cf. FIG. 2 and FIG. 3). More specifically, after the optical fiber cables 37,38 being led out of the plug housing 33 straightly in an axial direction of each ferrule 39 have been accommodated in the straight path, and the lower spring cap 35 is to be engaged to the rear of the plug housing 33.

In this state, the guide ribs 49 of the plug housing 33 slide the guide rib engaging portions 56 of the lower spring cap 35, and, the engaging projections 51 of the plug housing engage the holes 55 of the lower spring cap 35 (cf. FIG. 3).

After completion of the first spring cap assembly step, the second spring cap assembly step starts (cf. FIG. 3). In the second spring cap assembly step, the optical fiber cables 37,38 being in the straight path are curved along the curved path.

The curved optical fiber cables 37,38 are prevented from restoring by the sidewall 60.

And then, the third spring cap assembly step is carried out. (cf. FIG. 3 and FIG. 4) In this step, the upper spring cap 36 is to be coupled to the lower spring cap 35. The guide grooves 70 of the upper spring cap 36 are guided to the respective ribs 66 of the lower spring cap 35, and, the holes 69 of the upper spring cap 36 engages the respective engaging projections 65 of the lower spring cap 35.

The assembly of the optical plug 31 completes as described above.

As described with referring to FIGS. 1–9, because the straight path and the curved path for the optical fiber cables 37,38 are provided in the lower spring cap 35, the lower spring cap 35 can be engaged with the plug housing 33 in a state that the optical fiber cables 37,38 led out of the plug housing 33 remain straight.

That is, the lower spring cap 35 can be engaged with the plug housing 33, while the optical fiber cables 37,38 led out of the plug housing 33 are arranged in the straight path.

After the lower spring cap 35 has been engaged with the plug housing 33, the straight optical fiber cables 37,38 in the straight path are shifted into the curved path and then the upper spring cap 36 is coupled to the lower spring cap 35, whereby the assembly of the optical plug completes.

Though the present optical plug 31 (i.e. an optical connector) has the same number of components as the prior art one, the assembly work efficiency can be improved by means of the above-described path change, thereby reducing the assembling cost.

In appearance and function, however, there is not a change from the prior art one.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

For example, the present invention is also applicable to an optical connector for a single optical fiber cable duplex transmission system. Also, the upper spring cap 36 instead of the lower spring cap 35 may be engaged with the plug housing 33. In such a case, the straight path and the curved path are formed on the upper spring cap 36.

Figure 10:
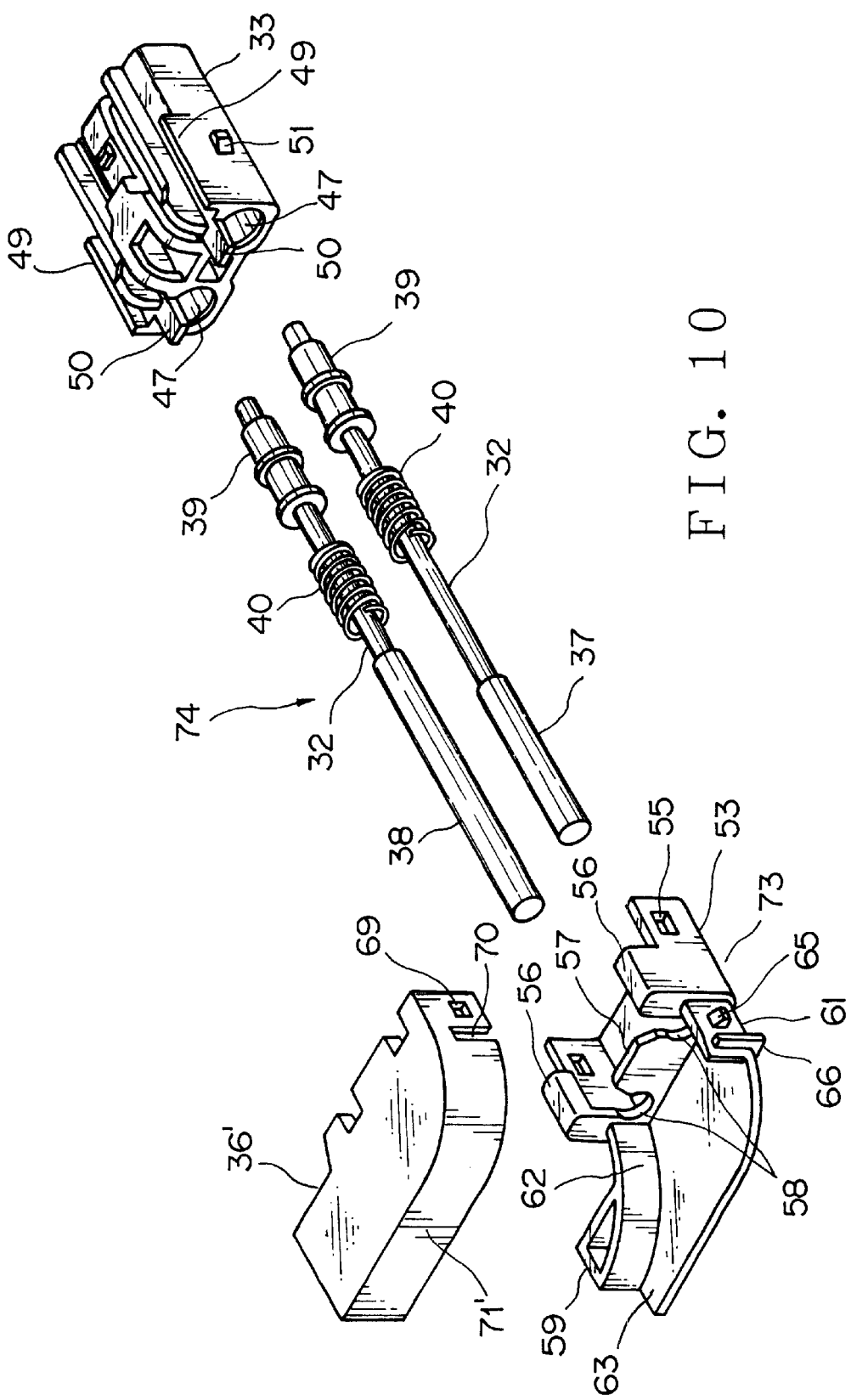
FIG. 10 is an exploded perspective view of the optical plug, showing another embodiment of a spring cap.

Further, a lower spring cap 73 (FIG. 10), wherein the sidewall 60, as the fiber cable fixing portion, of the lower spring cap 35 is removed, can substitute for the lower spring cap 35. Because an optical plug 74 having the lower spring cap 73 can also provide a straight and curved paths though the sidewall 60 is not provided, the optical plug 74 can attain better assembly work efficiency than that of the prior art optical plug 2 shown in FIG. 11. An upper spring cap 36' of the optical plug 74 has a sidewall 71' relative to the lower spring cap 73.

What is claimed is:

1. An optical plug usable as an optical connector comprising:
    a ferrule assembly further comprising
        an optical fiber cable and
        a ferrule connected to an end of the optical fiber cable and constituting the fernmle assembly along with the optical fiber cable;
    a spring arranged over the optical fiber cable an end of the spring pressing the ferrule;
    a plug housing to accommodate the ferrule assembly and the spring; and
    a spring cap to be connected to the plug housing for supporting another end of the spring, wherein
        the spring cap comprises a lower spring cap and an upper spring cap to couple with the lower spring cap at least one of the spring caps engaging the plug housing, and
        the one of the spring caps has a leading-out portion, whereby the one of the spring caps includes a straight path to straightly lead out the optical fiber cable in an axial direction of the ferrule and
        the one of the spring caps comprises a guide defining a curved path to curvingly lead out the optical fiber cable; wherein
            a closing portion to close the leading-out portion for the optical fiber cable arranged in the straight path is formed on the other of the spring caps.

2. The optical connector as set forth in claim 1, wherein the curved path has a fiber cable fixing portion to check restoration of the optical fiber cable being in a curved state and to define the curved path from the straight path.

3. An optical plug usable as an optical connector comprising:
    a ferrule assembly further comprising
        an optical fiber cable and
        a ferrule connected to an end of the optical fiber cable and constituting the ferrule assembly along with the optical fiber cable;
    a spring arranged over the optical fiber cable, an end of the spring pressing the ferrule;
    a plug housing to accommodate the ferrule assembly and the spring; and
    a spring cap to be connected to the plug housing for supporting another end of the spring, wherein
        the spring cap comprises a lower spring cap and an upper spring cap to couple with the lower spring cap, at least one of the spring caps engaging the plug housing, and
        the one of the spring caps has a leading-out portion, whereby the one of the spring caps includes a straight path to straightly lead out the optical fiber cable in an axial direction of the ferrule and
        the one of the spring caps comprises a guide defining a curved path to curvingly lead out the optical fiber cable; wherein
            the curved path has a fiber cable fixing portion to check restoration of the optical fiber cable being in a curved state and to define the curved path from the straight path.

4. An assembly method of an optical plug comprising a ferrule assembly, a plug housing, and a spring cap having a lower spring cap and an upper spring cap to couple with the lower spring cap, at least one of the spring caps engaging the plug housing and having a leading-out portion forming a straight path and a guide defining a curved path both for the optical fiber cable, comprising the steps of:

a fiber terminal end treatment step for forming the ferrule assembly by putting a compression spring over the optical fiber cable and by connecting the ferrule to an end of the optical fiber cable;

a ferrule assembly accommodation step for accommodating the ferrule assembly in the plug housing;

a first spring cap assembly step for accommodating the optical fiber cable led out of the plug housing in the straight path straightly in an axial direction of the ferrule and engaging the one of the spring caps with the plug housing;

a second spring cap assembly step for shifting the optical fiber cable from the straight path to the curved path; and a third spring cap assembly step for coupling the one of the spring caps with the other of the spring caps.

* * * * *